US007004388B2

(12) United States Patent
Kohta (10) Patent No.: US 7,004,388 B2
(45) Date of Patent: Feb. 28, 2006

(54) ELECTRONIC TICKET ISSUING SYSTEM AND ELECTRONIC TICKET ISSUING METHOD

(75) Inventor: Yoshihiro Kohta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/806,146

(22) Filed: Mar. 23, 2004

(65) Prior Publication Data

US 2004/0188520 A1 Sep. 30, 2004

(30) Foreign Application Priority Data

Mar. 25, 2003 (JP) .............................. 2003-083020

(51) Int. Cl.
*G06F 7/08* (2006.01)
(52) U.S. Cl. ..................................... 235/381; 235/382
(58) Field of Classification Search ................ 235/381, 235/382; 705/5, 6, 16, 18, 65
See application file for complete search history.

(56) References Cited

U.S. PATENT DOCUMENTS

| 5,598,477 | A | * | 1/1997 | Berson | 380/51 |
| 6,137,895 | A | * | 10/2000 | Al-Sheikh | 382/115 |
| 6,779,720 | B1 | * | 8/2004 | Lewis | 235/382 |
| 2003/0058084 | A1 | * | 3/2003 | O'Hara | 340/5.53 |
| 2003/0191721 | A1 | * | 10/2003 | Fiammante | 705/65 |
| 2004/0066276 | A1 | * | 4/2004 | Gile et al. | 340/5.53 |

FOREIGN PATENT DOCUMENTS

JP 2002-63305 A 2/2002

* cited by examiner

*Primary Examiner*—Karl D. Frech
*Assistant Examiner*—Lisa M. Caputo
(74) *Attorney, Agent, or Firm*—Foley & Lardner LLP

(57) ABSTRACT

An electronic ticket issuing system and an electronic ticket issuing method for simplifying authentication procedures by the use of biological information such as a fingerprint and voiceprint. First, a ticket buyer sends a request for ticket purchase to a ticket issuing center using his/her mobile terminal. The ticket issuing center transmits a request for issue of an electronic certificate to request an authentication department to issue an electronic certificate. The authentication department creates an electronic certificate to which the biological information about the ticket buyer is added. The ticket issuing center transmits an electronic ticket including the electronic certificate to the mobile phone. When the ticket buyer participates in an event with the electronic ticket, the ticket buyer transmits the electronic ticket with the biological information to an authentication terminal. In addition, the ticket buyer inputs his/her biological information at the moment into the authentication terminal. Subsequently, the authentication terminal compares the two pieces of biological information for authentication. Since the electronic ticket includes the biological information, the authentication terminal can perform high-security authentication without exchanging the biological information with the authentication department via a network.

6 Claims, 4 Drawing Sheets

F I G. 1

F I G. 3

ELECTRONIC TICKET ISSUING SYSTEM AND ELECTRONIC TICKET ISSUING METHOD

BACKGROUND OF THE INVENTION

The present invention generally relates to electronic ticket issuing systems and electronic ticket issuing methods, and in particular, to an electronic ticket issuing system and an electronic ticket issuing method for issuing an electronic ticket provided with an electronic certificate including biological information.

DESCRIPTION OF THE RELATED ART

In a conventional electronic ticket issuing method using a mobile phone, etc., a ticket is authenticated with a bar code displayed on the screen of the mobile phone or a credit-card number. However, this authentication method causes the following problems.

In such an authentication method, a third party other than the ticket buyer may use the ticket. Namely, the ticket buyer may sell the ticket to a third party at an exorbitant price, or a third party may illegally use a stolen ticket. Further, it is easy to forge an electronic ticket with a bar code displayed on the screen of a mobile phone.

In light of the problems mentioned above, a biometric authentication method has attracted a great deal of attention. In an electronic ticket issuing system employing the biometric authentication method, first, a user who is to receive an electronic ticket issuing service measures and registers in advance his/her unique physical characteristics (biological information) in the system. When the user actually receives a service of the system, he/she measures his/her biological information again. The system checks whether or not the pre-registered information is identical to the latest measured information for authentication. Examples of the biological information include a fingerprint, iris, facial configuration and voiceprint.

The biometric authentication is preferably performed with biological information that is proved to be unique and unchanged over the lifetime. The above-described examples of the biological information have been recognized to be unique and unchanged. It is difficult to forge such biological information, thereby realizing enhanced security. Moreover, the biometric authentication can eliminate the need for complex processes with a user ID and a password.

There is proposed a technique of a biometric authentication method for authenticating an electronic ticket by a ticket dealer, for example, in Japanese Patent Application Laid-Open No. 2002-063305.

In the technique proposed in the above application, mobile information terminal possessed by a ticket buyer is equipped with a personal identification terminal for generating biological information about a fingerprint. The ticket buyer stores his/her fingerprint as first fingerprint information in advance in an event server that performs authentication. On this occasion, the event server stores the first fingerprint information with the telephone number of the mobile information terminal of the ticket buyer.

When booking a ticket, the user inputs his/her fingerprint information into the personal identification terminal to generate second fingerprint information, and transmits it to the event server. Subsequently, the event server performs first authentication by checking whether or not the second fingerprint information is identical with the first fingerprint information. By this means, the user can book a ticket.

When the ticket buyer enters into an event site, he/she inputs his/her fingerprint information as third fingerprint information from the personal identification terminal into a personal computer placed at the event site. The personal computer accesses the event server to perform second authentication by checking whether the third fingerprint information is identical with the first fingerprint information.

However in this prior art, the ticket buyer has to perform authentication with his/her fingerprint information two times, namely, when booking a ticket and participating in an event. This would be complicated for the ticket buyer.

Further, at the time of the second authentication, the third fingerprint information about the ticket buyer is transmitted from the personal computer to the event server. Subsequently, the event server performs the second authentication and transmits the authentication result back to the personal computer. The transmission and reception of the fingerprint information and the authentication result may be delayed according to the traffic situation of a network between the both sides. Considering that quick entry procedure is required for ticket buyers in the event site, the delay should be avoided as much as possible.

As mentioned above, a conventional electronic ticket selling system includes an identification terminal and an identification station utilizing biological information for authentication. When performing authentication of a ticket buyer, biological information is input from the ticket buyer into the identification terminal. The identification terminal transmits the input biological information to the identification station via a network to request the identification station to perform authentication. Subsequently, the identification station compares the pre-registered biological information and the transmitted biological information. Subsequently, the identification station outputs an authentication result and transmits the result to the identification terminal via the network. By this means, a series of procedures for authentication is performed.

In this system, the biological information and the authentication result are transmitted and received via the network between the identification station and the identification terminal. In this case, however, when the traffic of the network is overcrowded, the transmission and reception in connection with the authentication may be delayed. Especially in the place of an entrance of a sporting event site or a concert, or a boarding gate of a vehicle, many ticket holders move in and out and this situation may cause heavy traffic in the network. Accordingly, it is preferable to avoid such delay in communication for smooth authentication.

SUMMARY OF THE INVENTION

It is therefore an object of the present invention to provide a system for issuing electronic tickets, which is capable of simplifying a ticket buyer's purchase procedures and authentication procedures, and a method for issuing the same.

It is another object of the present invention to provide a system for issuing electronic tickets, which is capable of eliminating the need for registering biological information about a ticket buyer to reduce loads on the whole system, and a method for issuing the same.

For achieving the objects mentioned above, there is provided an electronic ticket issuing system comprising a mobile terminal including a storage for storing an electronic ticket, a ticket issuing center for creating an electronic ticket, an authentication department for creating an electronic certificate which validates a ticket user, and an authentication terminal for performing authentication between a ticket buyer (holder) and an electronic ticket, wherein the mobile terminal, the ticket issuing center, the authentication department, and the authentication terminal are connected to each other via a network, and the authentication terminal is connected to the mobile terminal to perform authentication between the ticket buyer and the electronic ticket. In the electronic ticket issuing system, first biological information which indicates unique physical characteristics of the ticket buyer is registered in advance in the authentication department. Subsequently, the mobile terminal transmits a request for ticket purchase to the ticket issuing center. Thereafter, the ticket issuing center transmits a request for issue of an electronic certificate to the authentication department to request the authentication department to issue an electronic certificate corresponding to the request for ticket purchase transmitted from the mobile terminal. Subsequently, the authentication department creates an electronic certificate including the pre-registered first biological information on the basis of the request for issue of an electronic certificate transmitted from the ticket issuing center, and transmits the electronic certificate to the ticket issuing center. Thereafter, the ticket issuing center creates an electronic ticket to which the electronic certificate transmitted from the authentication department is added, and transmits the electronic ticket to the mobile terminal. Subsequently, the mobile terminal stores the electronic ticket transmitted from the ticket issuing center in the storage.

At the time of authentication, the mobile terminal transmits the electronic ticket stored in the storage to the authentication terminal. Subsequently, second biological information which indicates unique physical characteristics of the ticket buyer is input into the authentication terminal. Thereafter, the authentication terminal performs authentication by comparing the first biological information added to the electronic ticket with the second biological information, and outputs a corresponding authentication result.

The above-described mobile terminal may be replaced by an information terminal which includes a storage removable from the information terminal for storing the electronic ticket and which is connected to a biological information generating section for generating the first biological information. In this case, at the time of ticket purchase, the biological information generating section generates the first biological information and transmits the first biological information to the authentication department. Namely, there is no need to register in advance the biological information in the authentication department. Further, the authentication department creates the electronic certificate including the first biological information transmitted from the information terminal on the basis of the request for issue of an electronic certificate transmitted from the ticket issuing center, and transmits the electronic certificate to the ticket issuing center.

Furthermore, at the time of authentication in this case, the electronic ticket is input from the removable storage to the authentication terminal.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the drawings, embodiments of the present invention are explained in detail.

According to the present invention, an electronic ticket for a concert, sporting event, train ticket, airline ticket, ship ticket, etc. is provided with an electronic certificate including biological information such as a fingerprint and voiceprint. The electronic ticket including the electronic certificate is transmitted to a mobile phone via a network. By this means, a user can use the mobile terminal or an IC card as a ticket. In this electronic ticket issuing system, biological information about a ticket buyer is included in the electronic ticket. The biological information indicates unique physical characteristics of a ticket buyer and validates the ticket buyer. Accordingly, a ticket buyer can perform authentication at the time of entering into an event site and a concert hall, or boarding a train, an airplane, a ship, and the like. Especially, authentication procedures required for boarding an airplane can be simplified by adding biological information to a passport.

[Configuration of First Embodiment]

Figure 1:
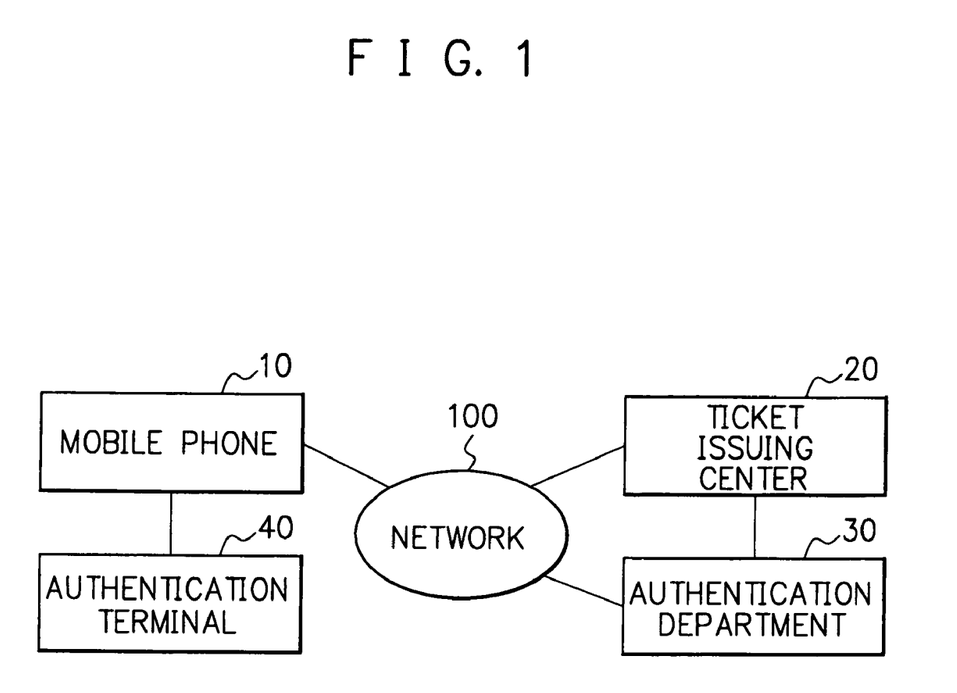
FIG. 1 is a block diagram showing a configuration of an electronic ticket issuing system according to a first embodiment of the present invention.

In reference to FIG. 1, the electronic ticket issuing system according to the first embodiment comprises a mobile phone 10, a ticket issuing center 20, an authentication department 30, an authentication terminal 40, and a network 100 for connecting them to each other.

The mobile phone 10 possessed by a ticket buyer comprises a storage for storing an issued electronic ticket. The telephone number of the mobile phone 10 and biological information such as a fingerprint, iris, facial configuration and a voiceprint of the ticket buyer are registered in advance in the authentication department 30. The biological information can be registered in the department 30 in various ways. For example, when a fingerprint is used as biological information, the fingerprint may be input into a scanner and transmitted to the department 30 via the network. Otherwise, a scanner may be placed at the side of the authentication department 30 and a fingerprint may be registered in the department 30 via the scanner. For another example, when a voiceprint is used as biological information, the voiceprint is generated in a voiceprinter or the like and encrypted voiceprint information is transmitted to and registered in the department 30. Incidentally, the ways to registration is not limited to the above examples.

When the ticket buyer actually buys a ticket, the ticket buyer uses the mobile phone 10 to send a request to buy a ticket to the ticket issuing center 20 to obtain a desired ticket. Moreover, the mobile phone 10 stores an issued electronic ticket in the storage.

Moreover, when entering into an event site or a concert hall, or boarding a vehicle, etc., the ticket buyer uses the mobile phone 10 for authentication procedures. In this case, the ticket buyer transmits the electronic ticket stored in the mobile phone 10 to the authentication terminal 40 placed at, for example, the entrance of the event site, concert hall or the vehicle.

The ticket issuing center 20 transmits a request for issue of an electronic certificate to the authentication department to request the department 30 to create and issue an electronic certificate corresponding to the request from the ticket buyer.

Moreover, the ticket issuing center 20 receives the electronic certificate issued by the authentication department 30, and creates an electronic ticket provided with the electronic certificate. Subsequently, the center 20 transmits the created electronic ticket with the electronic certificate to the mobile phone 10 possessed by the ticket buyer.

The authentication department 30 receives from the ticket buyer his/her telephone number and biological information such as a fingerprint, a voiceprint and/or the like and registers them in advance.

Moreover, the authentication department 30 creates the electronic certificate including the pre-registered biological information about the ticket buyer according to the request from the ticket issuing center 20. The electronic certificate validates the ticket buyer. The department 30 transmits the created electronic certificate to the ticket issuing center 20.

The authentication terminal 40 is placed at, for example, entrances of a sporting event site, a concert hall, a vehicle, and the like to perform authentication with the biological information input in the terminal 40. First, the terminal 40 receives the electronic ticket from the mobile phone 10. Subsequently, the terminal 40 reads out the biological information included in the electronic ticket. Further, the terminal 40 reads out the biological information input by the ticket buyer at the moment. Thereafter, the terminal 40 compares the pre-registered biological information and the latest input biological information for authentication.

[Operation of First Embodiment]

In the following, an explanation will be given of an operation of the electronic ticket issuing system according to the first embodiment referring to FIGS. 1 and 2.

Figure 2:
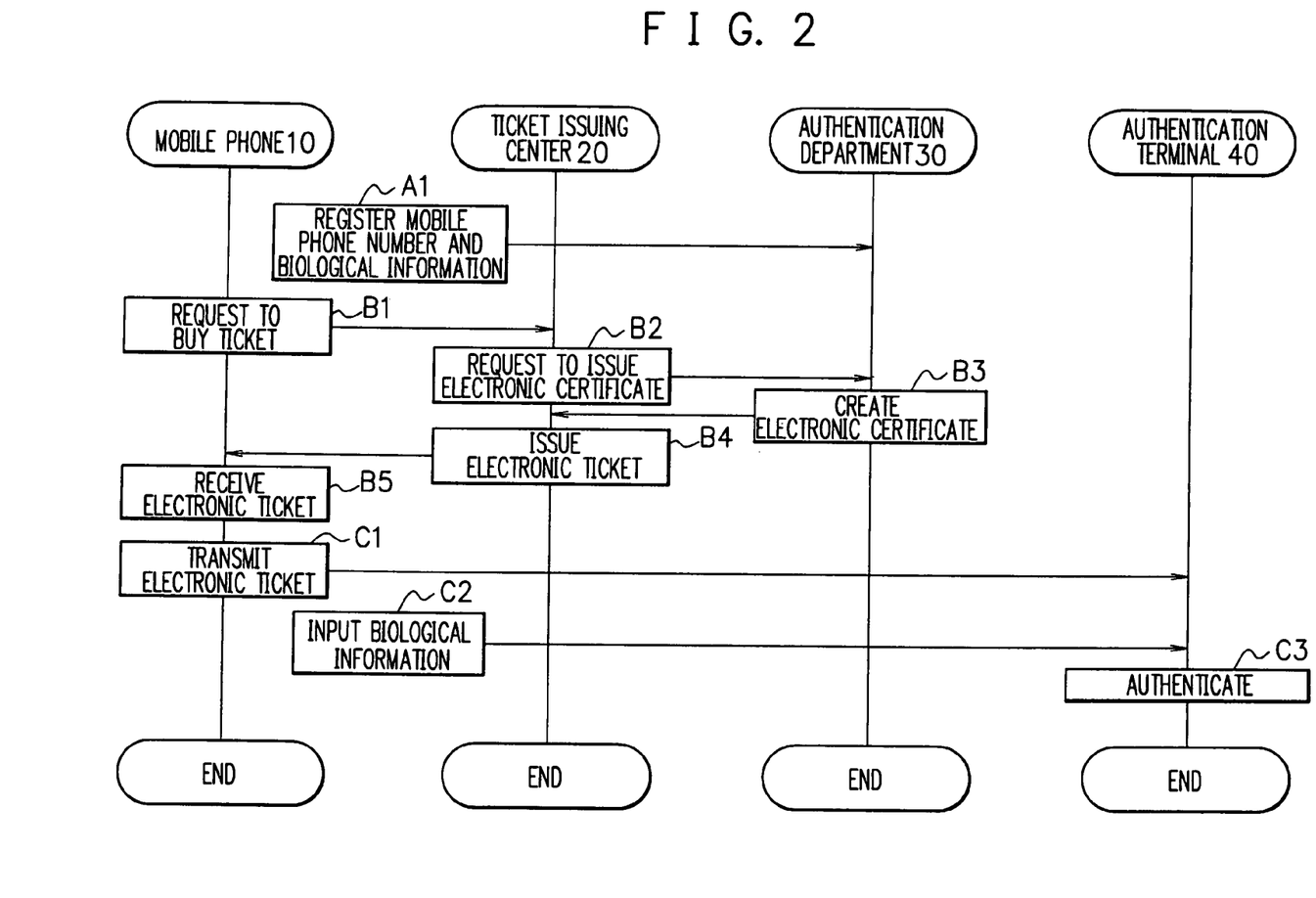
FIG. 2 is a timing chart for explaining operational procedures of the system according to the first embodiment of the present invention.

In reference to FIG. 2, a ticket buyer registers in advance the mobile phone number of the mobile phone 10 and his/her biological information such as a fingerprint and/or voiceprint in the authentication department 30 (Step A1).

At the time of ticket purchase, the ticket buyer uses the mobile phone 10 to send a request for ticket purchase to the ticket issuing center 20 (Step B1).

The ticket issuing center 20 requests the authentication department 30 to issue an electronic certificate according to the request from the ticket buyer (Step B2).

The authentication department 30 creates an electronic certificate including the biological information registered at Step A1 according to the request from the ticket issuing center 20, and transmits the created electronic certificate to the ticket issuing center 20 (Step B3).

The ticket issuing center 20 receives the electronic certificate created at Step B3, and creates an electronic ticket to which the electronic certificate is added, and transmits the electronic ticket provided with the electronic certificate to the mobile phone 10 of the ticket buyer via the network 100 (Step B4).

The ticket buyer receives the electronic ticket transmitted at Step B4 at the mobile phone 10 and stores the ticket in the storage (Step B5).

When entering a sporting event site or a concert hall, or boarding a vehicle, the ticket buyer transmits the electronic ticket stored in the mobile terminal 10 (storage) from the terminal 10 to the authentication terminal 40 placed at an entrance of the event site or the vehicle for authentication procedures (Step C1).

After Step C1, the ticket buyer inputs his/her biological information such as own fingerprint and/or voiceprint into the authentication terminal 40 (Step C2).

The authentication terminal 40 reads out the biological information from the electronic ticket received from the mobile terminal 10 at Step C1, and the biological information input at Step C2. Thereafter, the terminal 40 compares the two pieces of the biological information to perform authentication (Step C3).

When the authentication terminal 40 succeeds in the authentication, the ticket buyer is allowed to enter the site, etc. or board a vehicle.

As described above, according to the first embodiment, the electronic ticket obtained by the ticket buyer includes his/her biological information. Accordingly, a series of authentication procedures can be performed only within the authentication terminal 40. Namely, there is no need to transmit and receive the biological information to and from the authentication department 30. Accordingly, it becomes possible to overcome the problem of delay of authentication owing to the heavy traffic of the network, which occurs in the conventional method.

Further by the operation described above, it becomes possible to prevent a third party other than the ticket buyer from using the electronic ticket. This is because the identify of a ticket user is confirmed with the mobile phone number and the unique biological information at the time of using the electronic ticket.

Moreover, it becomes possible to prevent a ticket buyer from assigning or selling an obtained electronic ticket to a third party. Especially, it becomes possible to prevent an illegal trade of an electronic ticket at an excessive price and illegal use by a third party. This is because the electronic ticket includes the biological information so as to be valid for the ticket buyer only.

Furthermore, it becomes difficult to forge the electronic ticket due to the individual biological information included in the electronic ticket. Accordingly, an event promoter, etc. can find out a suspicious person before the person enters an event hall, boards a vehicle, etc.

[Configuration of Second Embodiment]

In the following, an explanation will be given of a second embodiment of the present invention.

Figure 3:
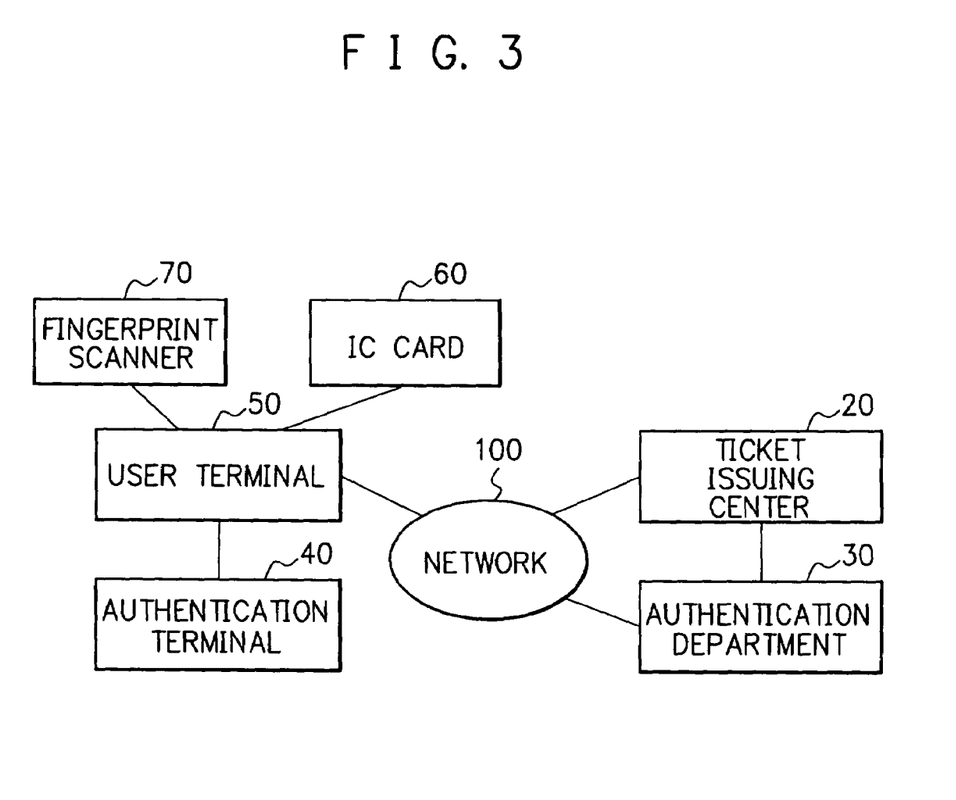
FIG. 3 is a block diagram showing a configuration of an electronic ticket issuing system according to a second embodiment of the present invention.

In reference to FIG. 3, the configuration of the electronic ticket issuing system according to the second embodiment has the same configuration as that of the first embodiment except that the mobile terminal is replaced by a user terminal (information terminal) 50 possessed by a ticket buyer. The user terminal 50 includes an IC card 60 that is removable from the terminal 50. Further, a fingerprint scanner 70 is connected to the user terminal 50.

Moreover, at the time of ticket purchase, the ticket buyer uses the user terminal 50 to send a request for ticket purchase to the ticket issuing center 20, and send biological information generated by the fingerprint scanner 70 to the authentication department 30. Subsequently, the terminal 50 receives an electronic ticket issued by the ticket issuing center 20 and stores the ticket in the IC card 60.

The IC card 60 is preliminarily issued by the ticket issuing center 20 and possessed by the ticket buyer. The IC card 60 is removable from the user terminal 50 and stores therein the electronic ticket transmitted from the ticket issuing center 20, the biological information necessary for ticket buying, and the like.

Moreover, when actually participating in an event, the IC card 60 in which the electronic ticket is stored is removed from the user terminal 50 and carried around the ticket buyer. At the time of authentication at the entrance of the event site, the ticket buyer uses the IC card 60 to inputs the electronic ticket stored therein into the authentication terminal 40.

The fingerprint scanner 70 is connected to the user terminal 50, and generates biological information of the ticket buyer. When buying a ticket, the ticket buyer generates biological information of his/her fingerprint with the fingerprint scanner 70. The generated biological information is fed into the user terminal 50 and transmitted from the terminal 50 to the authentication department 30.

The ticket issuing center 20 requests the authentication department 30 to issue an electronic certificate corresponding to the request from the ticket buyer.

Moreover, the ticket issuing center 20 receives the electronic certificate issued by the authentication department 30, and creates an electronic ticket to which the electronic certificate is added. Subsequently, the center 20 transmits the created electronic ticket with the electronic certificate to the user terminal 50.

The authentication department 30 receives the biological information transmitted from the ticket buyer when the ticket buyer purchases a ticket. Subsequently, the department 30 creates an electronic certificate including the biological information about the ticket buyer according to the request for issue of the electronic certificate from the ticket issuing center 20. Subsequently, the department 30 transmits the electronic certificate including the biological information to the ticket issuing center 20.

The authentication terminal 40 is placed at an entrance of an event site for a sport, a concert, a vehicle, etc. The terminal 40 performs authentication when fed with the biological information about the ticket buyer. The terminal 40 receives the electronic ticket from the IC card 60 possessed by the ticket buyer. Subsequently, the terminal 40 reads out the biological information included in the electronic ticket as well as the biological information latest input by the ticket buyer. Thereafter, the terminal 40 performs authentication by comparing the two pieces of biological information.

The electronic ticket issuing system according to the second embodiment has almost the same configuration and operation as those of the first embodiment except that the following two points. First, the biological information is generated in the fingerprint scanner 70 at the time of ticket purchase and transmitted to the authentication department 30 instead of pre-registering the biological information in the department 30. Second, the ticket buyer uses the IC card 60 removed from the user terminal 50 as a ticket in place of the mobile phone 10.

Accordingly, a ticket buyer does not have to register his/her biological information in the authentication department 30 in advance. Instead, the ticket buyer generates the biological information about his/her fingerprint information using the fingerprint scanner 70 at the time of ticket purchase, and transmits the biological information to the department 30. Consequently, the authentication department 30 does not have to register therein the biological information, thereby realizing reduced loads on the department 30. Moreover, the electronic ticket transmitted from the ticket issuing center 20 is written in the IC card 60. Namely, the IC card 60 is carried around and utilized as a ticket.

[Operation of Second Embodiment]

In the following, an explanation will be given of an operation of the electric ticket issuing system according to the second embodiment of the present invention in reference to FIGS. 3 and 4.

Figure 4:
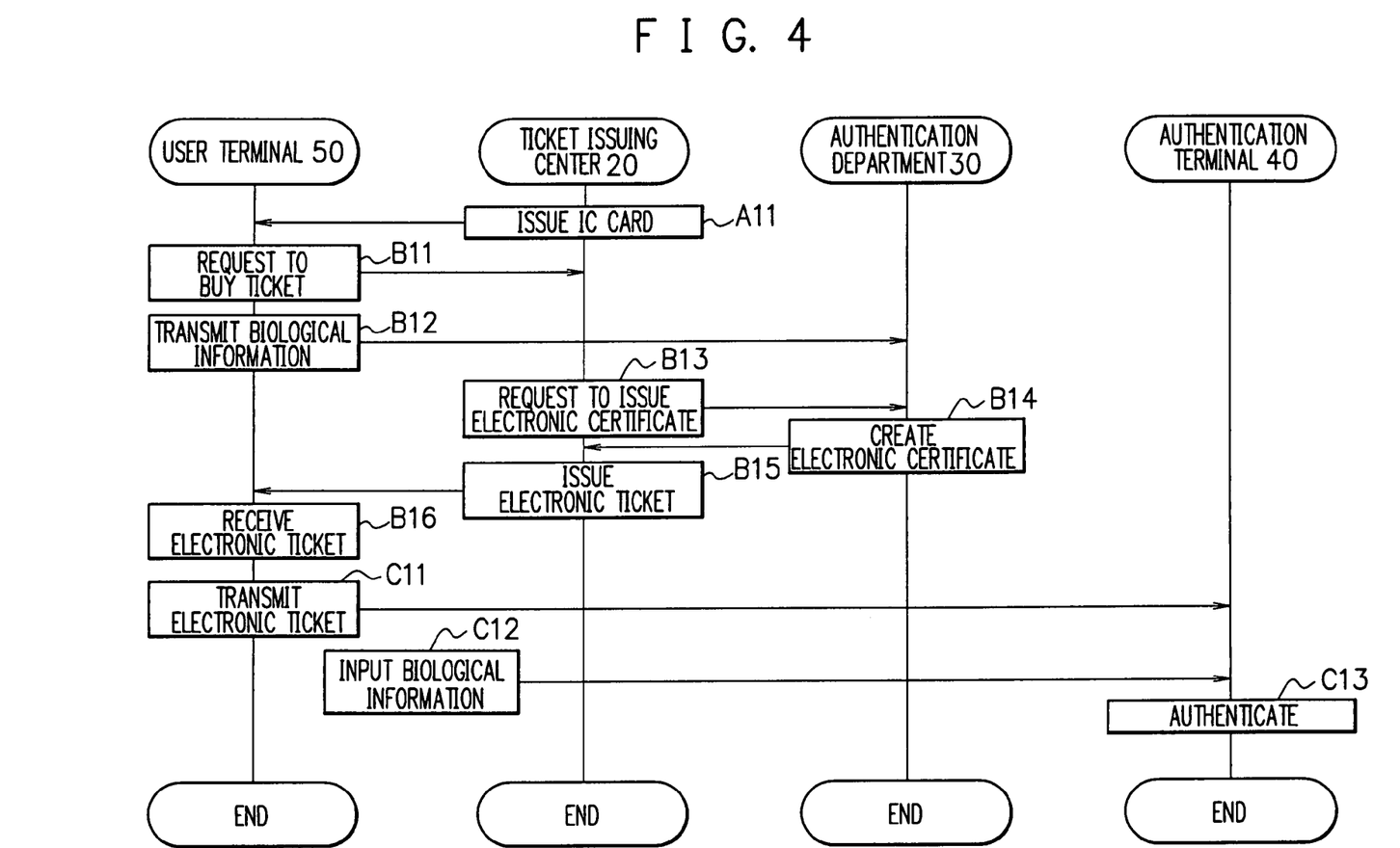
FIG. 4 is a timing chart for explaining operational procedures of the system according to the second embodiment of the present invention.

In reference to FIG. 4, the ticket issuing center 20 issues the IC card 60 to be possessed by the ticket buyer in advance (Step A11).

The ticket buyer applies to the ticket issuing center 20 for a ticket using the user terminal 50 (Step B11).

Subsequently, the ticket buyer generates his/her biological information using the fingerprint scanner 70 and transmits the biological information to the authentication department 30 (Step B12).

The ticket issuing center 20 requests the authentication department 30 to issue an electronic certificate corresponding to the request from the ticket buyer (Step B13).

The authentication department 30 creates an electronic certificate including the biological information transmitted form the user terminal 50 at Step B12, and transmits the created electronic certificate with the biological information to the ticket issuing center 20 (Step B14).

The ticket issuing center 20 receives the electronic certificate created by the authentication department 30 at Step B14, and issues and transmits an electronic ticket to which the electronic certificate is added to the user terminal 50 possessed by the ticket buyer via the network 100 (Step B15).

The user terminal 50 receives the electronic ticket transmitted from the ticket issuing center 20, and writes the electronic ticket into the IC card 60 (Step B16).

The ticket buyer brings the IC card 60, which is removed from the user terminal 50, with him/her when entering into an event site for a sport, a concert, or boarding a vehicle. The authentication terminal 40 is placed at the entrance of the event site, vehicle, etc. The ticket buyer inputs the electronic ticket stored in the IC card 60 into the authentication terminal 40 by contacting the card 60 with or having the card 60 close to the authentication terminal 40 for authentication (Step C11).

After the Step C11, the ticket buyer inputs his/her own biological information about his/her fingerprint into the authentication terminal 40 for authentication (Step C12).

The authentication terminal 40 reads out the biological information included in the electric ticket received from the IC card 60 at Step C11. Further, the terminal 40 reads out the biological information input at Step C12. Subsequently, the terminal 40 compares the two pieces of biological information (two fingerprints) to perform authentication (Step C13).

After the authentication terminal 40 succeeds in the authentication, the ticket buyer is allowed to enter the event site or board on a vehicle.

According to the second embodiment, the electronic ticket in the IC card 60 possessed by the ticket buyer already includes biological information of the ticket buyer. Accordingly, a series of the authentication procedures can be performed only within the authentication terminal 40. Accordingly, there is no need to perform communication between the authentication terminal 40 and the authentication department 30 via a network at the time of authentication. Consequently, the authentication can be performed without delay caused by heavy traffic in the network, the delay occurring in the conventional method.

By the operation described above, it becomes possible to prevent a third party other than a ticket buyer from illegally using an electronic ticket. This is because biological information is included in the IC card and used for user identification.

Moreover, it becomes possible to prevent a ticket buyer from assigning or selling an obtained electronic ticket to a third party. Especially, it becomes possible to prevent an illegal trade of an electronic ticket at an excessive price and illegal use by a third party. This is because the electronic ticket includes the biological information so as to be valid for the ticket buyer only.

Moreover, it becomes difficult to forge an electronic ticket since individual biological information is included in the electronic ticket. Accordingly, an event promoter, etc. can find out a suspicious person who tries to illegally enter into the event site, or board a vehicle, etc.

Incidentally, an electronic ticket issuing method is realized in an electronic ticket issuing system which comprises a mobile terminal including a storage for storing an electronic ticket, a ticket issuing center, an authentication department, and an authentication terminal, wherein the mobile terminal, the ticket issuing center, the authentication department, and the authentication terminal are connected to each other via a network, and wherein the authentication terminal is connected to the mobile terminal to perform authentication between a ticket buyer and an electronic ticket. The electronic ticket issuing method comprises a first step of registering in advance first biological information which indicates unique physical characteristics of a ticket buyer in the authentication department, a second step of transmitting a request for ticket purchase from the mobile terminal to the ticket issuing center, a third step of transmitting a request for issue of an electronic certificate from the ticket issuing center to the authentication department to request the authentication department to issue an electronic certificate that validates the ticket buyer corresponding to the request for ticket purchase transmitted from the mobile terminal, a fourth step of creating an electronic certificate including the pre-registered first biological information on the basis of the request for issue of an electronic certificate transmitted from the ticket issuing center, and transmitting the electronic certificate from the authentication department to the ticket issuing center, a fifth step of creating an electronic ticket to which the electronic certificate transmitted from the authentication department is added, and transmitting the electronic ticket from the ticket issuing center to the mobile terminal, and a sixth step of storing the electronic ticket transmitted from the ticket issuing center in a storage of the mobile terminal.

In addition to the above-described steps, there are performed a seventh step of transmitting, at the time of authentication, the electronic ticket stored in the storage from the mobile terminal to the authentication terminal, an eighth step of inputting second biological information which indicates unique physical characteristics of the ticket buyer into the authentication terminal, and a ninth step of performing authentication by comparing the first biological information added to the electronic ticket with the second biological information, and outputting a corresponding authentication result.

When the mobile terminal used in the electronic ticket issuing system is substituted with an information terminal which includes a storage removable from the information terminal for storing the electronic ticket and which is connected to a biological information generating section for generating the first biological information, in the first step, the first biological information is generated in the biological information generating section connected to the information terminal, and transmitted to the authentication department at the time of ticket purchase. Further in the fourth step, the electronic certificate including the first biological information transmitted from the information terminal is created on the basis of the request for issue of an electronic certificate transmitted from the ticket issuing center, and transmitted from the authentication department to the ticket issuing center. Moreover in the seventh step, the electronic ticket is input from the removable storage to the authentication terminal at the time of authentication.

As set forth hereinbefore, according to the present invention, it becomes possible to simplify the ticket purchase procedures and authentication procedures performed by a ticket buyer.

Moreover, a ticket buyer inputs his/her biological information at the time of ticket purchase. Accordingly, it becomes possible to eliminate the needs for an authentication authority to store biological information required for authentication procedures. Consequently, it becomes possible to reduce the burden on the whole system.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An electronic ticket issuing system, comprising:
   a mobile terminal including a storage for storing an electronic ticket;
   a ticket issuing center;
   an authentication department; and
   an authentication terminal, wherein:
   the mobile terminal, the ticket issuing center, the authentication department, and the authentication terminal are connected to each other via a network, and the authentication terminal is connected to the mobile terminal to perform authentication between a ticket buyer and an electronic ticket;
   first biological information which indicates unique physical characteristics of the ticket buyer is registered in advance in the authentication department;
   the mobile terminal transmits a request for ticket purchase to the ticket issuing center;
   the ticket issuing center transmits a request for issue of an electronic certificate to the authentication department to request the authentication department to issue an electronic certificate which corresponds to the request for ticket purchase transmitted from the mobile terminal and which validates the ticket buyer;
   the authentication department creates an electronic certificate including the pre-registered first biological information on the basis of the request for issue of an electronic certificate transmitted from the ticket issuing center, and transmits the electronic certificate to the ticket issuing center;
   the ticket issuing center creates an electronic ticket to which the electronic certificate transmitted from the authentication department is added, and transmits the electronic ticket to the mobile terminal;
   the mobile terminal stores the electronic ticket transmitted from the ticket issuing center in the storage; and wherein:
at the time of authentication:
(1) the mobile terminal transmits the electronic ticket stored in the storage to the authentication terminal;
(2) second biological information which indicates unique physical characteristics of the ticket buyer is input into the authentication terminal; and
(3) the authentication terminal performs authentication by comparing the first biological information, which is contained within the electronic certificate added to the electronic ticket, with the second biological information, and outputs a corresponding authentication result.

2. An electronic ticket issuing system as claimed in claim 1, comprising:
in place of the mobile terminal, an information terminal which includes a storage removable from the information terminal for storing the electronic ticket and which is connected to a biological information generating section for generating the first biological information, wherein:
at the time of ticket purchase, the biological information generating section generates the first biological information and transmits the first biological information to the authentication department;
the authentication department creates the electronic certificate including the first biological information transmitted from the information terminal on the basis of the request for issue of an electronic certificate transmitted from the ticket issuing center, and transmits the electronic certificate to the ticket issuing center; and
wherein at the time of authentication, the electronic ticket is input from the removable storage into the authentication terminal.

3. An electronic ticket issuing method performed in an electronic ticket issuing system which comprises a mobile terminal including a storage for storing an electronic ticket, a ticket issuing center, an authentication department, and an authentication terminal, wherein the mobile terminal, the ticket issuing center, the authentication department, and the authentication terminal are connected to each other via a network, and wherein the authentication terminal is connected to the mobile terminal to perform authentication between a ticket buyer and an electronic ticket, comprising:
a first step of registering in advance first biological information which indicates unique physical characteristics of a ticket buyer in the authentication department;
a second step of transmitting a request for ticket purchase from the mobile terminal to the ticket issuing center;
a third step of transmitting a request for issue of an electronic certificate from the ticket issuing center to the authentication department to request the authentication department to issue an electronic certificate which corresponds to the request for ticket purchase transmitted from the mobile terminal and which validates the ticket buyer;
a fourth step of creating an electronic certificate including the pre-registered first biological information on the basis of the request for issue of an electronic certificate transmitted from the ticket issuing center, and transmitting the electronic certificate from the authentication department to the ticket issuing center;
a fifth step of creating an electronic ticket to which the electronic certificate transmitted from the authentication department is added, and transmitting the electronic ticket from the ticket issuing center to the mobile terminal;
a sixth step of storing the electronic ticket transmitted from the ticket issuing center in the storage of the mobile terminal;
a seventh step of transmitting, at the time of authentication, the electronic ticket stored in the storage from the mobile terminal to the authentication terminal;
an eighth step of inputting second biological information which indicates unique physical characteristics of the ticket buyer into the authentication terminal; and
a ninth step of performing authentication by comparing the first biological information added to the electronic ticket with the second biological information, and outputting a corresponding authentication result.

4. An electronic ticket issuing method as claimed in claim 3, which is performed in an electronic ticket issuing system comprising, in place of the mobile terminal, an information terminal which includes a storage removable from the information terminal for storing the electronic ticket and which is connected to a biological information generating section for generating the first biological information, wherein:
in the first step, the first biological information is generated in the biological information generating section connected to the information terminal, and transmitted to the authentication department at the time of ticket purchase; and
in the fourth step, the electronic certificate including the first biological information transmitted from the information terminal is created on the basis of the request for issue of an electronic certificate transmitted from the ticket issuing center, and transmitted from the authentication department to the ticket issuing center.

5. An electronic ticket issuing system, comprising:
a mobile terminal including a storage for storing an electronic ticket;
a ticket issuing center;
an authentication department; and
an authentication terminal, wherein:
the mobile terminal, the ticket issuing center, the authentication department, and the authentication terminal are connected to each other via a network, and the authentication terminal is connected to the mobile terminal to perform authentication between a ticket buyer and an electronic ticket;
said authentication department storing first biological information which indicates unique physical characteristics of the ticket buyer, said first biological information registered in advance in the authentication department in association with the identity of the mobile terminal;
wherein, upon transmission by the mobile terminal of a request for ticket purchase to the ticket issuing center, the ticket issuing center transmits a request for the first biological information registered in association with the identified mobile terminal to the authentication department, and the authentication department retrieves the stored first biological information associated with the identified mobile terminal and forwards the retrieved biological information to the ticket issuing center,
the ticket issuing center creates an electronic ticket which includes the first biological information added thereto and transmits the electronic ticket with the added biological information to the mobile terminal;
the mobile terminal stores the electronic ticket and the biological information transmitted from the ticket issuing center in the storage; and wherein:
at the time of authentication:
(1) the mobile terminal transmits the electronic ticket including the first biological information stored in the storage to the authentication terminal;
(2) second biological information which indicates at least one unique physical characteristic of the ticket buyer is input into the authentication terminal; and
(3) the authentication terminal performs authentication by comparing the first biological information, which is added to the electronic ticket and received from the mobile terminal storage, with the second biological information, and outputs a corresponding authentication result.

6. An electronic ticket issuing method performed in an electronic ticket issuing system which comprises a mobile terminal including a storage for storing an electronic ticket, a ticket issuing center, an authentication department, and an authentication terminal, wherein the mobile terminal, the ticket issuing center, the authentication department, and the authentication terminal are connected to each other via a network, and wherein the authentication terminal is connected to the mobile terminal to perform authentication between a ticket buyer and an electronic ticket, comprising the steps of:

registering in the authentication department first biological information which indicates unique physical characteristics of a ticket buyer in association with an identity of the mobile terminal used by the ticket buyer;

transmitting a request for ticket purchase from the mobile terminal to the ticket issuing center;

transmitting a request from the ticket issuing center to the authentication department for the first biological information associated with the identified mobile terminal;

transmitting from the authentication department to the ticket issuing center the first biological information stored in association with the identified mobile terminal;

creating an electronic ticket to which the first biological information is added, and transmitting the electronic ticket from the ticket issuing center to the mobile terminal;

storing the electronic ticket and the first biological information transmitted from the ticket issuing center in the storage of the mobile terminal;

transmitting, at the time of authentication, the electronic ticket and the first biological information stored in the storage from the mobile terminal to the authentication terminal;

inputting second biological information which indicates at least one unique physical characteristic of the ticket buyer into the authentication terminal; and performing authentication by comparing the first biological information added to the electronic ticket with the second biological information, and outputting a corresponding authentication result.

* * * * *